United States Patent
Reid et al.

(10) Patent No.: US 10,928,416 B2
(45) Date of Patent: Feb. 23, 2021

(54) DUAL HEATED RAMP FOR ICE AND WATER MANAGEMENT IN ANGLE OF ATTACK SENSORS

(71) Applicant: Rosemount Aerospace Inc., Burnsville, MN (US)

(72) Inventors: Alexander N. Reid, St. Louis Park, MN (US); Richard Alan Schwartz, Fairbault, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 170 days.

(21) Appl. No.: 15/975,378

(22) Filed: May 9, 2018

(65) Prior Publication Data

US 2019/0346478 A1  Nov. 14, 2019

(51) Int. Cl.
  *G01P 13/02* (2006.01)
  *B64D 15/00* (2006.01)
  *G01P 13/00* (2006.01)

(52) U.S. Cl.
  CPC ........... *G01P 13/025* (2013.01); *B64D 15/00* (2013.01); *G01P 13/004* (2013.01); *G01P 13/02* (2013.01)

(58) Field of Classification Search
  CPC ....... G01P 13/02; G01P 13/025; G01P 13/004
  See application file for complete search history.

(56) References Cited

U.S. PATENT DOCUMENTS

| | | |
|---|---|---|
| 3,665,760 A | 5/1972 | Pitches et al. |
| 5,025,661 A | 6/1991 | McCormack |
| 5,322,246 A | 6/1994 | Henne et al. |
| 5,438,865 A | 8/1995 | Greene |
| 5,466,067 A | 11/1995 | Hagen et al. |
| 5,628,565 A | 5/1997 | Hagen et al. |
| 10,393,766 B2 | 8/2019 | Alcaya et al. |
| 2004/0188945 A1 | 9/2004 | Poincet et al. |
| 2015/0082878 A1 | 3/2015 | Bigand |
| 2015/0344137 A1 | 12/2015 | Bartz et al. |
| 2016/0114883 A1 | 4/2016 | Guerry et al. |
| 2016/0356175 A1 | 12/2016 | Waddington |
| 2019/0210734 A1 | 7/2019 | Whalen |
| 2019/0242924 A1* | 8/2019 | Lang ............. G01P 5/165 |

(Continued)

FOREIGN PATENT DOCUMENTS

| | | |
|---|---|---|
| CA | 2745138 A1 | 1/2012 |
| CN | 105142246 A | 12/2015 |
| CN | 107687350 A | 2/2018 |

(Continued)

OTHER PUBLICATIONS

Extended European Search Report for European Patent Application No. 19173361.7, dated Sep. 11, 2019, 11 pages.

(Continued)

*Primary Examiner* — Paul M. West
(74) *Attorney, Agent, or Firm* — Kinney & Lange, P.A.

(57) ABSTRACT

An angle of attack sensor includes a vane assembly and a multi-piece faceplate adjacent the vane assembly. The faceplate includes a mounting plate having an opening and a heated chassis positioned adjacent the mounting plate and having a ring portion extending through the opening, the ring portion defining a ring-shaped deflector that surrounds the vane assembly and extends beyond an exterior surface of the mounting plate.

19 Claims, 3 Drawing Sheets

(56) References Cited

U.S. PATENT DOCUMENTS

2019/0346479 A1 11/2019 Reid

FOREIGN PATENT DOCUMENTS

| | | |
|---|---|---|
| CN | 107843249 A | 3/2018 |
| DE | 102008007469 A1 | 8/2009 |
| EP | 1844863 A1 | 10/2007 |
| EP | 2950106 A1 | 12/2015 |
| EP | 2980589 A1 | 2/2016 |
| EP | 3012187 A1 | 4/2016 |
| EP | 3056884 A1 | 8/2016 |
| EP | 3413025 A1 | 12/2018 |
| EP | 3567376 A1 | 11/2019 |
| WO | WO03087847 A1 | 10/2003 |

OTHER PUBLICATIONS

Extended European Search Report for European Patent Application No. 19173355.9, dated Sep. 11, 2019, 12 pages.

Extended European Search Report for European Patent Application No. 18215700.8 dated May 20, 2019, 9 pages.

Communication Pursuant to Article 94(3) EPC for European Patent Application No. 18215700.8, dated Jul. 8, 2020, 4 pages.

\* cited by examiner

DUAL HEATED RAMP FOR ICE AND WATER MANAGEMENT IN ANGLE OF ATTACK SENSORS

BACKGROUND

The present disclosure relates to sensors, and in particular, to angle of attack sensors.

Angle of attack sensors with rotatable vanes are installed on the exterior of aircraft to measure the aircraft angle of attack, the angle between oncoming airflow and the aircraft zero line (a reference line of the aircraft, such as a chord of a wing of the aircraft). The angle of attack sensor is mounted to the aircraft such that the rotatable vane protrudes outside the aircraft and is exposed to oncoming airflow. Aerodynamic forces acting on the rotatable vane cause the vane to align with the direction of the oncoming airflow. Rotational position of the vane is sensed and used to determine the aircraft angle of attack.

Oncoming airflow may contain water or ice particles that collect on the exterior surface, or faceplate, of the angle of attack sensor. The water can freeze onto the faceplate and accumulate near the vane. Large ice growths near the vane can interfere with the accuracy of the angle of attack sensor output.

SUMMARY

An angle of attack sensor includes a vane assembly and a multi-piece faceplate adjacent the vane assembly. The faceplate includes a mounting plate having an opening and a heated chassis positioned adjacent the mounting plate and having a ring portion extending through the opening, the ring portion defining a ring-shaped deflector that surrounds the vane assembly and extends beyond an exterior surface of the mounting plate.

A method for preventing significant ice accumulation on a faceplate adjacent a vane assembly, the faceplate including a heated chassis adjacent a mounting plate, includes re-routing fluid and particles away from an exterior surface of the mounting plate with a fore ramp of a deflector defined by the heated chassis and re-routing fluid away from the exterior surface of the mounting plate with an aft ramp of the deflector.

A heated chassis for use in an angle of attack sensor having a vane assembly and a multi-piece faceplate including a mounting plate with an opening, is positioned adjacent the mounting plate. The heated chassis includes a pocket within which a portion of the vane assembly is positioned and a ring portion extending through the opening of the mounting plate and defining a heated ring-shaped deflector that surrounds the vane assembly and extends beyond an exterior surface of the mounting plate.

DETAILED DESCRIPTION

In general, the present disclosure describes a multi-piece faceplate of an angle of attack (AOA) sensor that includes a mounting plate and a heated chassis having a ring portion extending past the exterior surface of the mounting plate, the ring portion defining a deflector including a fore ramp and an aft ramp. The fore ramp deflects ice or water moving along an upstream portion of the exterior surface of the faceplate away from the faceplate, minimizing the opportunity for ice accumulation on the faceplate. The aft ramp routes fluid away from the exterior surface of the faceplate to prevent the fluid from running back and forming ice growths near and aft of the vane. The deflector prevents nucleation of ice accumulation that could affect movement of the vane and alter sensor output, without increasing part count or changing the existing heater architecture.

Figure 1A:
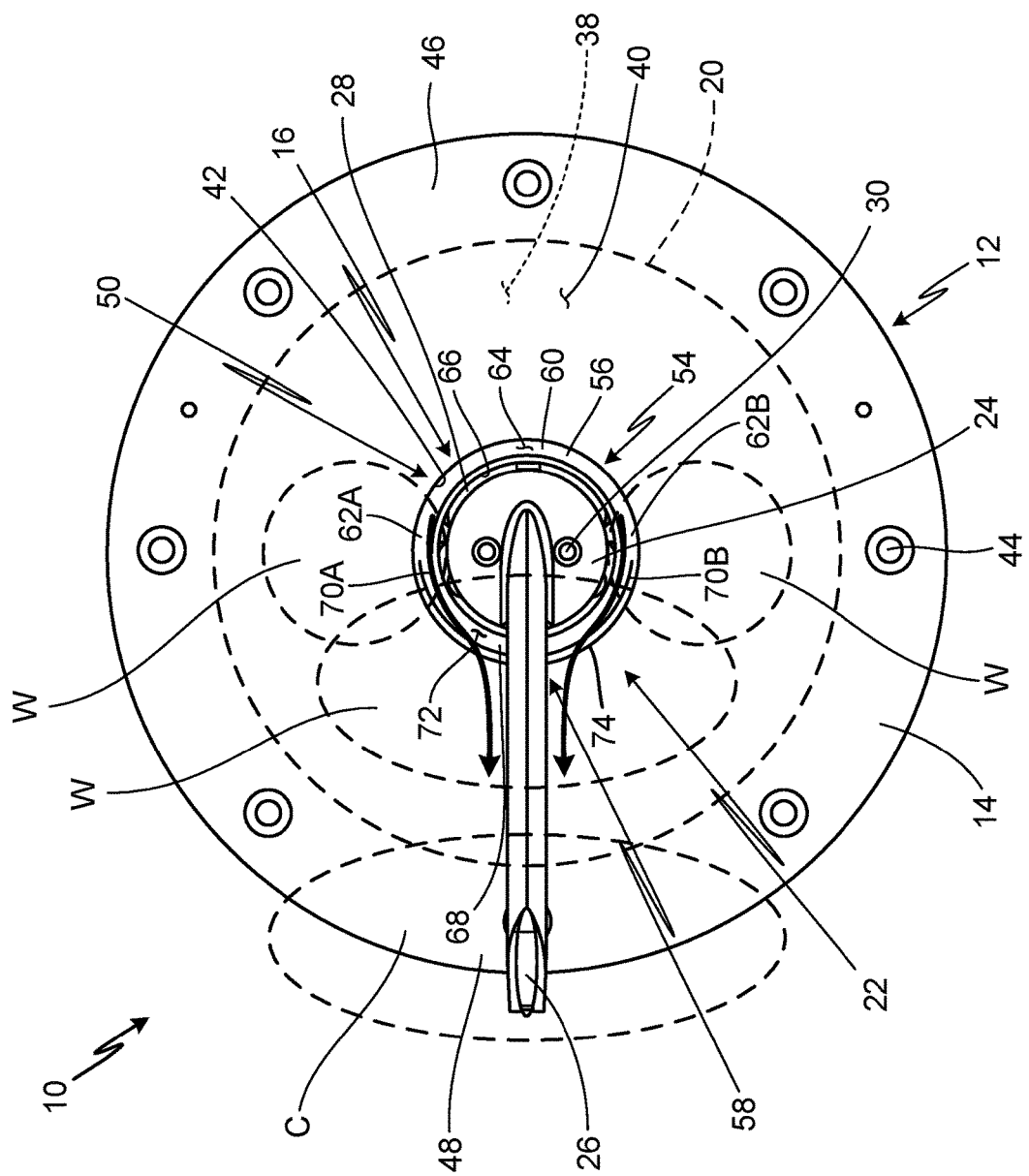
FIG. 1A is a top view of an angle of attack sensor.
Figure 1B:
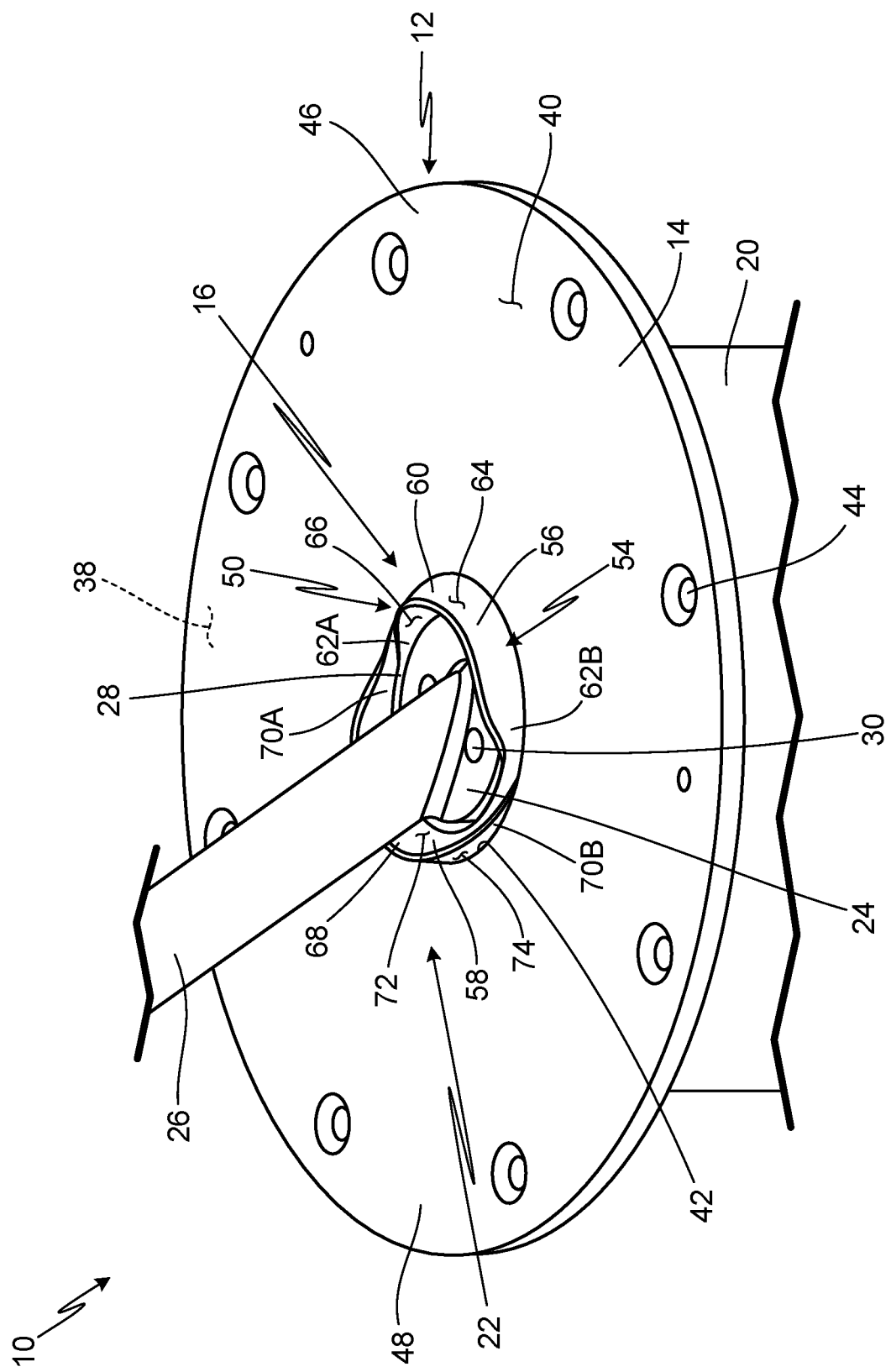
FIG. 1B is a partial isometric top view of the angle of attack sensor.
Figure 1C:
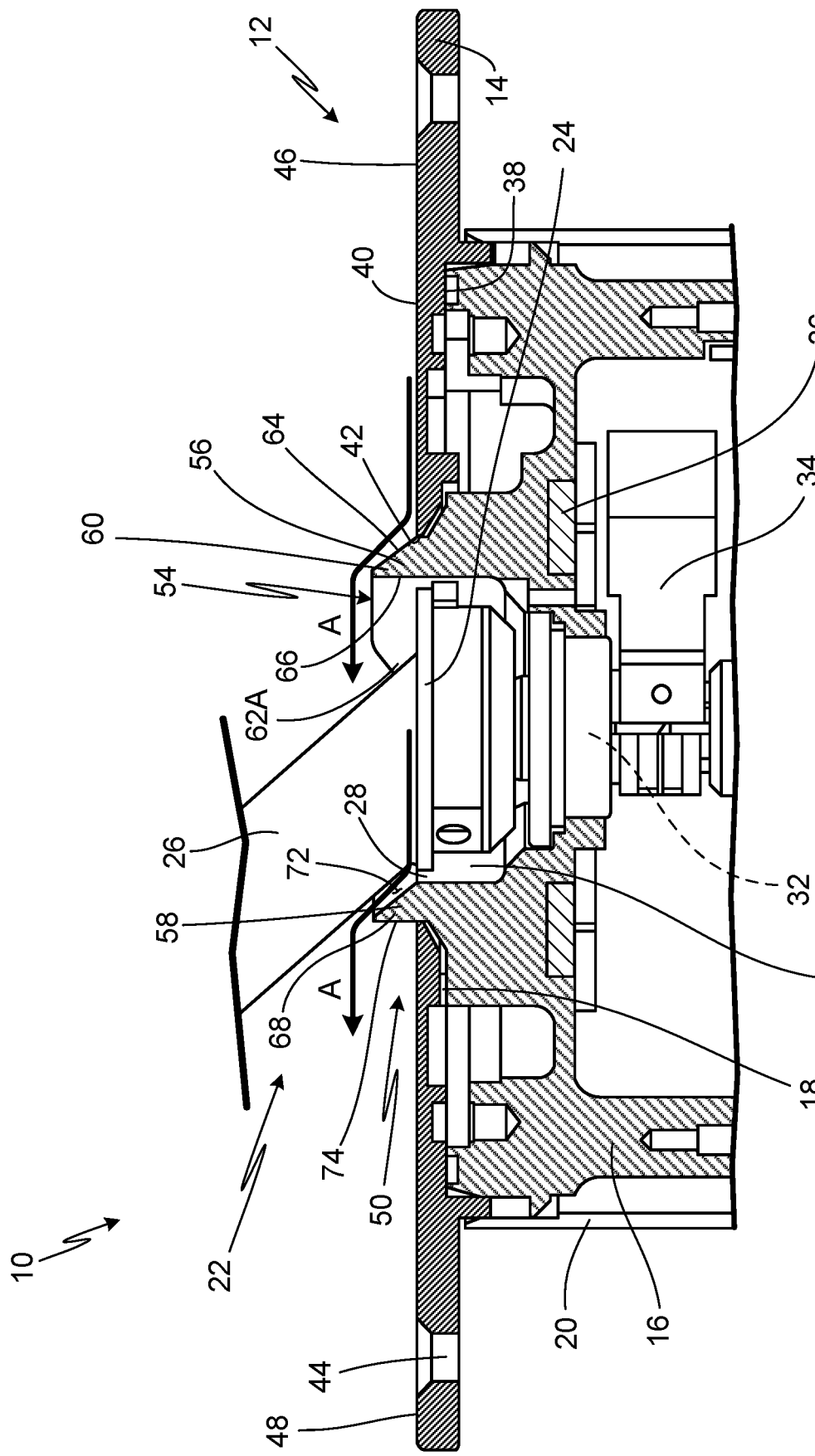
FIG. 1C is a partial cross-sectional side view of the angle of attack sensor.

FIG. 1A is a top view of angle of attack sensor 10. FIG. 1B is a partial isometric top view of angle of attack sensor 10. FIG. 1C is a partial cross-sectional side view of angle of attack sensor 10. Vane assembly 22 is not shown in cross-section in FIG. 1C. A lower portion of angle of attack sensor 10 has been omitted from FIGS. 1B and 1C for simplicity. FIGS. 1A, 1B, and 1C will be discussed together.

Angle of attack sensor 10 includes faceplate 12 (which includes mounting plate 14, heated chassis 16, and air gap 18), housing 20, vane assembly 22 (which includes vane base 24 and vane 26), annular gap 28, shaft connectors 30 (shown in FIGS. 1A and 1B), vane shaft 32 (shown in FIG. 1C), counterweight 34 (shown in FIG. 1C), and heater 36 (shown in FIG. 1C). Mounting plate 14 includes interior surface 38, exterior surface 40, opening 42, mounting holes 44, upstream portion 46, and downstream portion 48. Heated chassis 16 includes ring portion 50 and pocket 52 (shown in FIG. 1C). Ring portion 50 defines deflector 54, which includes fore ramp 56 and aft ramp 58. Fore ramp 56 includes center section 60, tapered end sections 62A and 62B, inclined outer surface 64, and vertical inner surface 66. Aft ramp 58 includes center section 68, tapered end sections 70A and 70B, inclined inner surface 72, and vertical outer surface 74.

Faceplate 12 is a multi-piece faceplate that includes mounting plate 14, or outer faceplate, and heated chassis 16, or inner faceplate. Mounting plate 14 is adjacent heated chassis 16. Heated chassis 16 is made of thermally conductive material. In this embodiment, heated chassis 16 is made of aluminum. In alternate embodiments, heated chassis 16 may include copper, other metals, metal alloys, or any other suitable thermally conductive material. Air gap 18 is a space between mounting plate 14 and heated chassis 16 that fills with air (or other insulating material). Mounting plate 14 is positioned on heated chassis 16 such that heated chassis 16 is located inward from or interior to mounting plate 14 with respect to housing 20. Housing 20 is cylindrical with an annular sidewall between an open first end and a closed second end. Faceplate 12 is positioned on housing 20 adjacent the open first end of housing 20. More specifically, heated chassis 16 is positioned within and connected to the open first end of housing 20 such that heated chassis 16 seals the open first end of housing 20. Mounting plate 14 is positioned on heated chassis 16 such that mounting plate 14 is adjacent the open first end of housing 20 and is outward from or exterior to heated chassis 16. As such, mounting plate 14 is an outer piece of faceplate 12 and heated chassis 16 is an inner piece of faceplate 12. Fasteners (not shown) connect mounting plate 14 and heated chassis 16.

Vane assembly 22 is adjacent faceplate 12. Vane assembly 22, which includes vane base 24 and vane 26, has a portion that is positioned in heated chassis 16 and extends through mounting plate 14. More specifically, vane base 24 is positioned in heated chassis 16. A first end of vane 26 is connected to vane base 24. Vane 26 extends through mounting plate 14. Annular gap 28 is adjacent vane base 24. Annular gap 28 is a space that surrounds vane base 24. Heated chassis 16 surrounds annular gap 28. As such, annular gap 28 is between vane base 24 and heated chassis 16. Consequently, annular gap 28 acts as a representation of the boundary between parts that rotate, such as vane 24 and vane base 24, and parts that do not rotate, such as mounting plate 14 and heated chassis 16. Vane base 24 receives shaft connectors 30. Shaft connectors 30 extend through vane base 24. A first end of rotatable vane shaft 32 is connected to vane base 24 via shaft connectors 30. A second end of vane shaft 32 extends into housing 20. Counterweight 34 is mounted on the second end of vane shaft 32. As such, vane base 24, vane shaft 32, and counterweight 34 are configured to rotate together. Heater 36 is positioned on, or embedded in, heated chassis 16. Heater 36 is annular, extending all the way around an end of heated chassis 16 within housing 20. Heater 36 may be a self-regulating heater, a thermostatically controlled heater, or any other suitable heater.

Mounting plate 14 has interior surface 38 facing toward an interior of angle of attack sensor 10. Interior surface 38 faces heated chassis 16. Exterior surface 40 of mounting plate 14 is the surface opposite interior surface 38, or the surface of mounting plate 14 that faces external airflow. Mounting plate 14 has circular opening 42 at its center, opening 42 extending from interior surface 38 to exterior surface 40. Vane assembly 22 extends through mounting plate 14 at opening 42. More specifically, vane 26 extends through opening 42. Mounting holes 44 are located around a periphery of mounting plate 14. Mounting holes 44 extend through mounting plate 14 from interior surface 38 to exterior surface 40. In this embodiment, mounting plate 14 has eight mounting holes 44. In alternate embodiments, mounting plate 14 may have any number of mounting holes 44. Upstream portion 46 is a portion of mounting plate 14 that is upstream with respect to oncoming airflow when angle of attack sensor 10 is installed on an aircraft. Downstream portion 48 is a portion of mounting plate 14 that is downstream from upstream portion 46 (and downstream with respect to oncoming airflow) when angle of attack sensor 10 is installed on an aircraft. Downstream portion 48 is adjacent upstream portion 46.

Heated chassis 16 includes ring portion 50. Ring portion 50 is an annular portion of heated chassis 16 that extends into and through opening 42 of mounting plate 14 such that ring portion 50 extends above, or beyond, exterior surface 40 of mounting plate 14. Ring portion 50 has a constant width. Opening 42 extends around ring portion 50, and ring portion 50 extends around vane assembly 22. Annular gap 28 is between ring portion 50 and vane assembly 22, such that ring portion 50 also surrounds annular gap 28. Heated chassis 16 defines pocket 52, within which a portion of vane assembly 22 is positioned. Specifically, vane base 24 of vane assembly 22 is positioned within pocket 52.

Ring portion 50 defines deflector 54. Deflector 54 is a ring-shaped water and ice deflector. Deflector 54 fully surrounds vane assembly 22 and extends above, or beyond, exterior surface 40 of mounting plate 14 into oncoming airflow. Deflector 54 includes fore ramp 56 at a fore-located or upstream portion of deflector 54 forward of vane 26. Aft ramp 58 is at an aft-located or downstream portion of deflector 54 rearward of vane 26. Fore ramp 56 is connected to aft ramp 58 at a center, or a diameter, of deflector 54. Deflector 54, including fore ramp 56 and aft ramp 58, is thermally coupled to heater 36 on heated chassis 16. Fore ramp 56 and aft ramp 58 both have flat top surfaces.

Fore ramp 56 has a center section 60 positioned between tapered end sections 62A and 62B. Center section 60 extends above, or beyond, exterior surface 40 of mounting plate 14 and protrudes into oncoming airflow. The maximum height of fore ramp 56 is at center section 60. In this embodiment, center section 60 has a constant height. Center section 60 is substantially normal to oncoming airflow when angle of attack sensor 10 is installed on an aircraft. Tapered end sections 62A and 62B decrease in height, or taper down, toward the center, or the diameter, of deflector 54. In this embodiment, end portions of tapered end sections 62A and 62B at the diameter, or center line, of deflector 54 are about flush with exterior surface 40 of mounting plate 14. Fore ramp 56 has inclined outer surface 64 at an outer surface of fore ramp 56 and vertical inner surface 66 at an inner surface of fore ramp 56. Inclined outer surface 64 has an incline in an aft direction. Inclined outer surface 64 begins about flush with exterior surface 40 of mounting plate 14 and extends aft to a height above, or beyond, exterior surface 40 of mounting plate 14. Vertical inner surface 66 is substantially vertical, or substantially perpendicular to exterior surface 40 of mounting plate 14.

Aft ramp 58 has a center section 68 positioned between tapered end sections 70A and 70B. Center section 68 extends above, or beyond, exterior surface 40 of mounting plate 14 and protrudes into oncoming airflow. The maximum height of aft ramp 58 is at center section 68. In this embodiment, center section 68 has a constant height. Center section 68 is substantially normal to oncoming airflow when angle of attack sensor 10 is installed on an aircraft. Tapered end sections 70A and 70B decrease in height toward the center, or the diameter, of deflector 54. In this embodiment, end portions of tapered end sections 70A and 70B at diameter, or center line, of deflector 54 are about flush with exterior surface 40 of mounting plate 14. Tapered end sections 70A and 70B taper down to meet end sections 62A and 62B of fore ramp 56. As such, tapered end sections 70A and 70B of aft ramp 58 are connected to tapered end sections 62A and 62B of fore ramp 56. Aft ramp 58 has inclined inner surface 72 at an inner surface of aft ramp 58 and vertical outer surface 74 at an outer surface of aft ramp 58. Inclined inner surface 72 has an incline in an aft direction. Inclined inner surface 72 begins about flush with exterior surface 40 of mounting plate 14 and extends aft to a height above, or beyond, exterior surface 40 of mounting plate 14. Vertical outer surface 74 is substantially vertical, or substantially perpendicular to exterior surface 40 of mounting plate 14. Inclined outer surface 64 of fore ramp 56 is continuous with inclined inner surface 72 of aft ramp 58.

Angle of attack sensors 10 are installed on the exterior of an aircraft and mounted to the aircraft via fasteners, such as screws or bolts, and mounting holes 44 on mounting plate 14. As a result, mounting plate 14 is about flush or just below flush with the skin of the aircraft and housing 20 extends within an interior of the aircraft. Vane 26 extends outside an exterior of the aircraft and is exposed to oncoming airflow, causing vane 26 and vane base 24 of vane assembly 22 to rotate with respect to mounting plate 14 and heated chassis 16 via a series of bearings within angle of attack sensor 10. Vane assembly 22 rotates based on the angle the aircraft is flying at relative to the oncoming airflow. More specifically, vane 26 rotates to be parallel with oncoming airflow. Vane 26 causes vane base 24 to rotate. Rotation of vane base 24 causes rotation of vane shaft 32, which is coupled to a rotational sensor that measures the local angle of attack or angle of the airflow relative to the fixed aircraft structure. Counterweight 34 is mounted on vane shaft 32 to counterbalance vane 26.

Heater 36 provides heat to heated chassis 16. Heated chassis 16 is made of thermally conductive material so that heated chassis 16 can conduct heat to the rotating components of angle of attack sensor 10, such as vane assembly 22 and vane shaft 32. Ring portion 50 allows heated chassis 16 to extend up to the exposed exterior surface 40 of mounting plate 14 in an area surrounding vane assembly 22 to provide heat to vane assembly 22. Ring portion 50 has a temperature above freezing in order to keep ice from forming on vane assembly 22 and in pocket 52. Heater 36 also provides heat to deflector 54 of ring portion 50. Heated chassis 26 maintains the area next to rotating components above freezing.

Mounting plate 14 is exposed to the external airflow, which is cold, and often contains water droplets or ice particles. A periphery of mounting plate 14 is also adjacent the aircraft skin, which is below freezing. Further, mounting plate 14 and heated chassis 16 are thermally isolated, such as by air gap 18. Air gap 38 creates physical separation between mounting plate 14 and heated chassis 16 to limit conduction between mounting plate 14 and heated chassis 16. Air gap 38 also reduces convection between mounting plate 14 and heated chassis 16 by creating insulation between mounting plate 14 and heated chassis 16. Thus, portions of mounting plate 14 are below freezing, creating cold areas C. Areas of mounting plate 14 away from ring portion 50, and rotating components, tend to be cold areas C. For example, a periphery of mounting plate 14 radially outward from housing 20 is thermally coupled with the aircraft skin, or aircraft mounting surface, making exterior surface 40 in that area significantly colder than exterior surface 40 in an area of mounting plate 14 adjacent heated chassis 16.

On the other hand, mounting plate 14 can become relatively warm in some areas due to radiation and/or conduction from heater 36 through heated chassis 16 and/or warming of air gap 18 between mounting plate 14 and heated chassis 16, creating warm areas W. For example, mounting plate 14 near ring portion 50 of heated chassis 16 is above freezing in certain environmental and flight conditions. As seen in FIG. 1A, warm areas W of mounting plate 14 are concentrated around ring portion 50, where heat is concentrated.

Therefore, mounting plate 14 is above freezing in some areas and below freezing in other areas. Ice particles from oncoming airflow that impinge on exterior surface 40 of mounting plate 14 in warm areas W, such as near ring portion 50, melt. Melting ice creates runback, or droplets of water that migrate aft toward exterior surface 40 of downstream portion 48.

Oncoming airflow A is approximately normal, or perpendicular, to center section 60 of fore ramp 56. As oncoming airflow A flows over faceplate 12, inclined outer surface 64 of fore ramp 56 re-routes fluid and particles in oncoming airflow A from exterior surface 40 of mounting plate 14. Fore ramp 56 deflects ice and water droplets away from exterior surface 40 of mounting plate 14. Specifically, water droplets and/or ice particles from oncoming airflow A directly impinge on inclined outer surface 64, which is angled to deflect, or throw, the particles back out into oncoming airflow A. Inclined inner surface 72 of aft ramp 58 re-routes fluid from exterior surface 40 of mounting plate 14 and heated chassis 16. Aft ramp 58 captures runback water that gets around fore ramp 56 and re-routes the water away from exterior surface 40 of mounting plate 14. As water flows over inclined inner surface 52, water is redirected toward and released into the oncoming airflow away from exterior surface 40 of mounting plate 14. Tapered end sections 62A, 62B, 70A, and 70B of fore ramp 56 and aft ramp 58, respectively, prevent the induction of eddy currents or little air pockets that may cause airflow problems. Tapered end sections 62A, 62B, 70A, and 70B also shape deflector 54 in a way that allows deflector 54 be a single unitary piece with heated chassis 16.

Runback water can re-freeze into ice when it encounters cold areas C of mounting plate 14, such as aft of vane 26 (as seen in FIG. 1A) or when it reaches the aircraft skin at the periphery of mounting plate 14. Such ice can create a nucleation site for ice accumulation, and ice crystals and/or super-cooled water droplets in the oncoming airflow can accumulate around the runback-initiated nucleation site. Ice accumulation can grow to a significant mass, building up to form large ice horns, near vane 26, which can displace vane 26 and result in errant readings from angle of attack sensor 10.

Fore ramp 56 minimizes the opportunity for precipitation to gather on exterior surface 40 of mounting plate 14 near vane assembly 22. Fore ramp 56 deflects ice and water droplets away from exterior surface 40 of mounting plate 14 so water droplets cannot re-freeze aft of vane 26. Aft ramp 58 carries precipitation away from exterior surface 40 of mounting plate 14 so that it cannot accumulate near vane 26. Aft ramp 58 catches water in the vicinity of vane assembly 22 that was not deflected away by fore ramp 56 to prevent such water from running back along downstream portion 48 of mounting plate 14 and re-freezing on exterior surface 40 of mounting plate 14 in cold areas C aft of vane 26. As such, deflector 54 controls precipitation around ring portion 50 to prevent significant ice accumulation on faceplate 12 in the vicinity of vane 26, which could deflect vane 26 to a substantial degree and affect the output of angle of attack sensor 10. By redirecting impinging ice or water away from exterior surface 40 of mounting plate 14 near vane assembly 22, deflector 54 prevents nucleation of ice accumulation aft of vane 26, eliminating deflection of vane 26 due to localized aerodynamics caused by ice accumulation in the vicinity of vane 26. Further, because deflector 54 is heated, impinging water does not re-freeze or build up onto deflector 54 itself or form ice growths just upstream of vane assembly 22.

Deflector 54 can be incorporated into the existing structure of faceplate 12 (such that mounting plate 14 is still removable without removing heated chassis 16) and uses the existing architecture of heater 36, avoiding a change to the heating scheme of angle of attack sensor 10. Further, deflector 54 is unitary with ring portion 50 of heated chassis 16, and thus, does not increase part count of angle of attack sensor 10.

DISCUSSION OF POSSIBLE EMBODIMENTS

The following are non-exclusive descriptions of possible embodiments of the present invention.

An angle of attack sensor includes a vane assembly; and a multi-piece faceplate adjacent the vane assembly, the faceplate including: a mounting plate having an opening; and a heated chassis positioned adjacent the mounting plate and having a ring portion extending through the opening, the ring portion defining a ring-shaped deflector that surrounds the vane assembly and extends beyond an exterior surface of the mounting plate.

The angle of attack sensor of the preceding paragraph can optionally include, additionally and/or alternatively, any one or more of the following features, configurations and/or additional components:

The deflector includes: a fore ramp at an upstream portion of the deflector; and an aft ramp at a downstream portion of the deflector.

The fore ramp includes: tapered end sections; and a center section between tapered end sections.

The center section of the fore ramp extends beyond the exterior surface of the mounting plate.

The center section of the fore ramp is configured to be substantially normal to oncoming airflow when the angle of attack sensor is installed on an aircraft.

The aft ramp includes: tapered end sections; and a center section between tapered end sections.

The center section of the aft ramp extends beyond the exterior surface of the mounting plate.

The center section of the aft ramp is configured to be substantially normal to oncoming airflow when the angle of attack sensor is installed on an aircraft.

The fore ramp includes: an inclined outer surface with an incline in an aft direction; and a vertical inner surface substantially perpendicular to the exterior surface of the mounting plate; and the aft ramp includes: an inclined inner surface with an incline in the aft direction; and a vertical outer surface substantially perpendicular to the exterior surface of the mounting plate.

The inclined outer surface is continuous with the inclined inner surface.

The deflector is configured to redirect impinging ice or water away from exterior surface of mounting plate.

The deflector is heated.

The angle of attack sensor further includes a heater thermally coupled to the deflector and positioned on the heated chassis.

A method for preventing significant ice accumulation on a faceplate adjacent a vane assembly, the faceplate including a heated chassis adjacent a mounting plate, includes re-routing fluid and particles away from an exterior surface of the mounting plate with a fore ramp of a deflector defined by the heated chassis; and re-routing fluid away from the exterior surface of the mounting plate with an aft ramp of the deflector.

The method of the preceding paragraph can optionally include, additionally and/or alternatively, any one or more of the following features, configurations and/or additional components:

Re-routing fluid away from the exterior surface of the mounting plate with an aft ramp of the deflector includes capturing the fluid and releasing the fluid into oncoming airflow.

A heated chassis for use in an angle of attack sensor having a vane assembly and a multi-piece faceplate including a mounting plate with an opening, the heated chassis positioned adjacent the mounting plate and including a pocket within which a portion of the vane assembly is positioned; and a ring portion extending through the opening of the mounting plate and defining a heated ring-shaped deflector that surrounds the vane assembly and extends beyond an exterior surface of the mounting plate.

The heated chassis of the preceding paragraph can optionally include, additionally and/or alternatively, any one or more of the following features, configurations and/or additional components:

A fore ramp at an upstream portion of the deflector forward of the vane; and an aft ramp at a downstream portion of the deflector rearward of the vane.

The fore ramp includes: tapered end sections; and a center section between tapered end sections; and the aft ramp includes: tapered end sections; and a center section between tapered end sections.

The fore ramp includes: an inclined outer surface with an incline in an aft direction; and a vertical inner surface substantially perpendicular to the exterior surface of the mounting plate; and the aft ramp includes: an inclined inner surface with an incline in the aft direction; and a vertical outer surface substantially perpendicular to the exterior surface of the mounting plate.

The inclined outer surface is continuous with the inclined inner surface.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An angle of attack sensor comprising:
    a vane assembly; and
    a multi-piece faceplate adjacent the vane assembly, the faceplate including:
        a mounting plate having an opening; and
        a heated chassis positioned adjacent the mounting plate and having a ring portion extending through the opening, the ring portion defining a ring-shaped deflector that surrounds the vane assembly and extends beyond an exterior surface of the mounting plate; wherein the deflector includes:
            a fore ramp at an upstream portion of the deflector; and
            an aft ramp at a downstream portion of the deflector, the aft ramp including an inclined inner surface with an incline in an aft direction.

2. The angle of attack sensor of claim 1, wherein:
    the fore ramp includes:
        an inclined outer surface with an incline in an aft direction; and
        a vertical inner surface substantially perpendicular to the exterior surface of the mounting plate; and
    the aft ramp includes:
        a vertical outer surface substantially perpendicular to the exterior surface of the mounting plate.

3. The angle of attack sensor of claim 2, wherein the inclined outer surface is continuous with the inclined inner surface.

4. The angle of attack sensor of claim 1, wherein the deflector is configured to redirect impinging ice or water away from exterior surface of mounting plate.

5. The angle of attack sensor of claim 1, wherein the deflector is heated.

6. The angle of attack sensor of claim 1, wherein the angle of attack sensor further includes a heater thermally coupled to the deflector and positioned on the heated chassis.

7. An angle of attack sensor comprising:
    a vane assembly; and a multi-piece faceplate adjacent the vane assembly, the faceplate including:
a mounting plate having an opening; and
a heated chassis positioned adjacent the mounting plate and having a ring portion extending through the opening, the ring portion defining a ring-shaped deflector that surrounds the vane assembly and extends beyond an exterior surface of the mounting plate; wherein the deflector includes:
a fore ramp at an upstream portion of the deflector, the fore ramp including:
tapered end sections; and
a center section between tapered end sections; and
an aft ramp at a downstream portion of the deflector.

8. The angle of attack sensor of claim 7, wherein the center section of the fore ramp extends beyond the exterior surface of the mounting plate.

9. The angle of attack sensor of claim 7, wherein the center section of the fore ramp is configured to be substantially normal to oncoming airflow when the angle of attack sensor is installed on an aircraft.

10. An angle of attack sensor comprising:
a vane assembly; and
a multi-piece faceplate adjacent the vane assembly, the faceplate including:
a mounting plate having an opening; and
a heated chassis positioned adjacent the mounting plate and having a ring portion extending through the opening, the ring portion defining a ring-shaped deflector that surrounds the vane assembly and extends beyond an exterior surface of the mounting plate; wherein the deflector includes:
a fore ramp at an upstream portion of the deflector; and
an aft ramp at a downstream portion of the deflector, the aft ramp including:
tapered end sections; and
a center section between tapered end sections.

11. The angle of attack sensor of claim 10, wherein the center section of the aft ramp extends beyond the exterior surface of the mounting plate.

12. The angle of attack sensor of claim 10, wherein the center section of the aft ramp is configured to be substantially normal to oncoming airflow when the angle of attack sensor is installed on an aircraft.

13. A method for preventing significant ice accumulation on a faceplate adjacent a vane assembly, the faceplate including a heated chassis adjacent a mounting plate, the method comprising:
re-routing fluid and particles away from an exterior surface of the mounting plate with a fore ramp of a deflector defined by the heated chassis, the fore ramp at an upstream portion of the deflector; and
re-routing fluid away from the exterior surface of the mounting plate with an aft ramp of the deflector, the aft ramp at a downstream portion of the deflector and including an inclined inner surface with an incline in an aft direction.

14. A method for preventing significant ice accumulation on a faceplate adjacent a vane assembly, the faceplate including a heated chassis adjacent a mounting plate, the method comprising:
re-routing fluid and particles away from an exterior surface of the mounting plate with a fore ramp of a deflector defined by the heated chassis; and
re-routing fluid away from the exterior surface of the mounting plate with an aft ramp of the deflector; wherein re-routing fluid away from the exterior surface of the mounting plate with an aft ramp of the deflector includes capturing the fluid and releasing the fluid into oncoming airflow.

15. A heated chassis for use in an angle of attack sensor having a vane assembly and a multi-piece faceplate including a mounting plate with an opening, the heated chassis positioned adjacent the mounting plate and comprising:
a pocket within which a portion of the vane assembly is positioned; and
a ring portion extending through the opening of the mounting plate and defining a heated ring-shaped deflector that surrounds the vane assembly and extends beyond an exterior surface of the mounting plate, wherein the deflector includes:
a fore ramp at an upstream portion of the deflector; and
an aft ramp at a downstream portion of the deflector, the aft ramp including an inclined inner surface with an incline in an aft direction.

16. The heated chassis of claim 15, wherein:
the fore ramp at the upstream portion of the deflector is forward of the vane; and
the aft ramp at the downstream portion of the deflector is rearward of the vane.

17. The heat chassis of claim 15, wherein:
the fore ramp includes:
an inclined outer surface with an incline in an aft direction; and
a vertical inner surface substantially perpendicular to the exterior surface of the mounting plate; and
the aft ramp includes:
a vertical outer surface substantially perpendicular to the exterior surface of the mounting plate.

18. The heated chassis sensor of claim 17, wherein the inclined outer surface is continuous with the inclined inner surface.

19. A heated chassis for use in an angle of attack sensor having a vane assembly and a multi-piece faceplate including a mounting plate with an opening, the heated chassis positioned adjacent the mounting plate and comprising:
a pocket within which a portion of the vane assembly is positioned; and
a ring portion extending through the opening of the mounting plate and defining a heated ring-shaped deflector that surrounds the vane assembly and extends beyond an exterior surface of the mounting plate, wherein the deflector includes:
a fore ramp at an upstream portion of the deflector, the fore ramp including:
tapered end sections; and
a center section between tapered end sections; and
an aft ramp at a downstream portion of the deflector, the aft ramp including:
tapered end sections; and
a center section between tapered end sections.

* * * * *